Oct. 12, 1937.   C. R. CARR   2,095,231
RIB MOUNTING FOR COTTON MACHINERY
Filed March 2, 1936
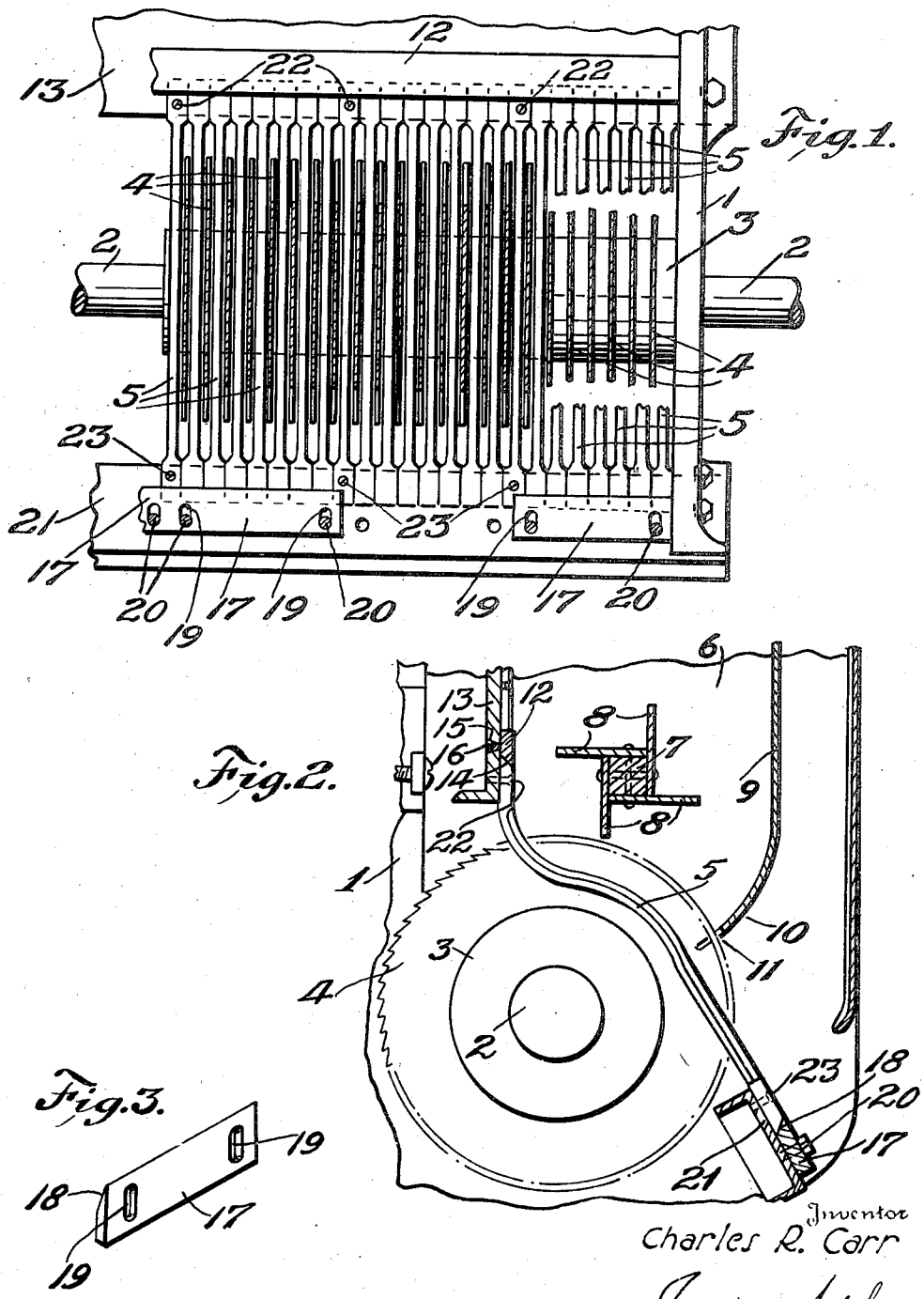
Inventor
Charles R. Carr
By Jack Ashley
Attorney Patented Oct. 12, 1937

2,095,231

UNITED STATES PATENT OFFICE 2,095,231

RIB MOUNTING FOR COTTON MACHINERY

Charles R. Carr, Dallas, Tex., assignor to The Murray Company, Dallas, Tex., a corporation of Texas Application March 2, 1936, Serial No. 66,691

3 Claims. (Cl. 19—62)

This invention relates to rib mountings for cotton machinery.

One object of the invention is to simplify the means of attachment and mounting of the rib elements or grate bar members that are placed in spaced working relation between the circular saw blades of ordinary or conventional cotton gins, linters and certain other cotton treating machine assemblies, to support the cotton for the action of the saws thereon.

Another object is to provide for the practical elimination of separate securing screws, bolts or other individual fasteners for the respective rib elements or bar members, except for a limited number thereof that may be utilized as spacers for the larger number of the ribs or bars comprising the entire assembly.

A further object is to provide for the firm and secure attachment, yet convenient and ready removal and replacement of the individual ribs or bars and at the same time provide for an easier adjustment and alignment of the ribs or bars with respect to the saws.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a fragmentary partial section and elevation of that portion of a cotton gin frame, saw cylinder parts and correlated rib elements and mountings directly concerned in the present invention;

Figure 2 is a transverse, vertical section through the portion of the machine shown in Figure 1; and Figure 3 is a detail perspective view of one of the detachable rib or bar securing elements detached.

Referring now to the drawing, the numeral 1 designates one of the upright side frame members of an ordinary cotton gin in which the shaft 2 of the saw cylinder 3 is journaled. As shown, more or less conventionally, the saw assembly comprises the regular series of spaced circular saw elements 4 secured on the cylinder 3 and rotating therewith, with the peripheral working portions of the saws projected between spaced rib elements or bars 5 to be presently more fully described and constituting a grill or grate fall assembly for holding the cotton being treated within the range of the working portions of the saw blades travelling above said grill or grate fall assembly.

In the feed or supply chamber 6 above the saw assembly and grill or grate fall assembly is a feeder or kicker roll or rotatable agitator element 7, which may be of any suitable or preferred type, but, as shown, comprises the blade portions 8. At one side of the element 7 is a wall plate 9 having its lower end portion 10 curved and extended close to the ribs or bars 5 of the grill or grate fall assembly, while its marginal portion is provided with slots 11 through which the peripheral portions of the saw blades 4 travel with just sufficient clearance so as not to come in contact with the plate portion 10.

So much of the structure that has been thus far described is of the usual conventional character in the ordinary gin, linter or similar cotton treating or processing machine.

The illustrative structure that enters more particularly and peculiarly into the present invention will now be described.

As hereinbefore generally stated, the present invention has more particularly to do with rib rails or supports and the provision for mounting the ribs or bars of the grill or grate fall assembly. The general form, contour and working relation of the ribs or bars with respect to the saw blades or other elements cooperating therewith may obviously vary according to the type of machine in which they are incorporated.

As shown, the upper rib holder 12 is secured to the vertical face portion of an upright frame member, wall-plate or rib rail 13 of the machine body structure, said rib holder 12 having a beveled bottom edge portion 14 producing an undercut shoulder against which the counterpart beveled upper ends of the respective ribs or bars 4 are made to fit retentively when placed in the grill or grate fall assembly.

The upper rib holder 12 may be secured to the frame member, wall-plate or rail 13 by any approved means. Preferably, it is secured in place by a welding process, and, as shown, the welding may be accomplished by a flux applying process wherein a tapered opening 15 is formed through the member 13 and the welding material 16 in a flowable state is filled into the opening 15 so that when set it adheres to the contiguous inner face portion of the rib holder 12. However, said rib holder may be obviously fastened securely in place by any other practical welding method, or by means of screws, bolts or other suitable means, as far as the present invention is concerned, it being borne in mind, however, that said rib holder 12 is to be permanently placed as distinguished from the lower rib holder, to be now described, which is readily detachable, at will, or as occasion may require, and is preferably made in separate unitary pieces or sections, as at 17.

As shown, the respective lower rib holder sections or units 17 are provided with beveled edge portions 18 producing, when applied, undercut shoulders for retaining the counterpart beveled lower ends of the ribs or bars 5. These holder members 17, as shown, are provided with transverse slots 19 near their ends for the application of securing screws 20 by which said holder members 17 are adjustably secured to the body frame member or lower rib rail 21 of the machine.

Only certain ones of the ribs or bars 5, spaced a definite distance apart in the assembly, are secured at their upper end portions to the body frame member or rib rail 13, adjacent to the upper holder 12, by individual screws 22, and similarly at their lower end portions to the lower frame member 21 by individual screws 23, said individually fastened ribs or bars constituting spacers for the respective groups of the other ribs or bars placed therebetween without any retentive means other than the overhanging shoulders 14, 18, of the respective rib holder members 12 and 17.

Obviously, by spacing the respective spacer ribs or bars a definite distance apart just sufficient to accommodate a given number of other ribs or bars to be placed in between them so as to be easily placeable and removable, the ribs or bars of each group, although fitted for such free relative movement for ready and convenient emplacement and removal, as occasion may require, are normally held firmly and securely in place on the supporting portions of the body frame of the machine and in proper grouped alignment and individual parallel working relation to the saws 4.

In mounting the ribs or bars 5 the spacer ribs or bars are first positioned at their respective locations, with their upper end portions fitted in the undercut shoulders 14 of the upper rib holder 12 and then secured by the screws 22, 23, to the body frame members or rib rails 13 and 21, respectively.

After the spacer ribs or bars are placed and secured, the other ribs or bars, in their respective groups, are placed with their upper end portions under the retaining shoulder 14 of the upper holder 12 and their lower end portions are secured to the lower frame member or rib rail 21 by applying one of the lower rib holder units or sections 17 with its beveled undercut shoulder portion 18 overlapping the counterpart beveled end portions of the adjacent ends of the group of ribs or bars 5.

It may be here noted that the slotting of said lower rib holder members 17 through which the headed securing screws 20 are applied facilitates the adjustment of said holder members 17 to tighten them against the ends of the ribs or bars and by which provision the rail members 17 are readily detachable whereby the ribs or bars may be removed and replaced for adjustment and repair, yet the ribs or bars are normally held securely in their cooperative relation to the blades of the saw cylinder assembly and at the same time the use of separate fastening means, such as the screws 22 and 23, or other separate means, for the individual ribs or bars is made unnecessary.

While in the illustrative drawing the upper rib holder, in character, is the fixed or permanently mounted one and the lower rib holder is the detachable one, it is obvious that the said provisions may be reversed, that is to say, the lower holder may be the fixed or permanent one and the upper one made detachable; or, in some cases, both the upper and the lower holder may be detachable in character and either made sectional or in one continuous piece; and other modifications may be made in the general structure without departing from the spirit and scope of the invention as herein specified and set forth in the appended claims. The invention, therefore, is not limited to the specific construction shown in the accompanying illustrative drawing.

What I claim and desire to secure by Letters Patent, is:

1. In a machine of the character described, an elongate support provided with a fixed rib holder extending longitudinally thereof, the rib holder having an undercut shoulder portion extending continuously along one edge thereof and forming with the contiguous face of the support a continuous and uninterrupted rib-receiving and retaining seat, an opposed elongate support provided with a detachable rib holder having a continuous shoulder portion forming with the contiguous face of the support a rib receiving and retaining seat similar to said first mentioned seat, and a grate assembly comprising a plurality of separate rib elements having laterally abutting end portions but otherwise spaced apart, said rib elements being formed with counterpart shoulders at their opposite ends to retentively engage under the shouldered portions of said fixed rib holder and said detachable rib holder, respectively, certain ones of the rib elements, at intervals throughout the extent of the grate assembly, being individually fastened at their opposite end portions to said elongate supports by securing means separate from and in addition to said fixed and detachable rib holders, whereby to provide positioning means with definitely proportioned intervening spaces for the accommodation of separate groups of the rib elements constituting the rest of the grate assembly.

2. In a machine of the character described, upper and lower supporting frame members, opposed rib holders on said upper and lower supporting frame members, the upper one of said rib holders being fixedly mounted and the lower one detachable, the detachable rib holder comprising a series of separate unitary sections longitudinally alined in endwise abutting relation to each other, the opposed longitudinal sides of said rib holders having continuous and uninterrupted undercut rib retaining formation, and a grate assembly comprising a multiplicity of rib elements each having counterpart extreme opposite end formation to interfit under the rib retaining formation of said rib holders, certain ones of said rib elements, at intervals throughout the extent of the grate assembly, being located a definite distance apart and respectively fastened individually at their opposite end portions to said upper and lower supporting frame members by securing means separate from and in addition to said rib holders, said rib elements thus located and fastened constituting positioning means with intervening spaces for the accommodation of definite groups of the other rib elements comprising the grate assembly.

3. In a machine of the character described, upper and lower elongate horizontal supports, opposed rib holders extending longitudinally on said supports and formed to provide with the contiguous faces of the supports continuous and uninterrupted rib receiving and retaining seats, one of said rib holders being detachable and comprising separate unitary sections longitudinally alined in endwise abutting relation to each other, and a grate assembly comprising separate rib elements having laterally abutting end portions but otherwise spaced apart, said rib elements being formed at their ends to retentively engage the seats provided by said rib holders on the horizontal supports, certain ones of said rib elements, at intervals throughout the extent of the grate assembly and coinciding with lines where the ends of the unitary sections of the detachable rib holder meet, being respectively individually fastened at their opposite end portions to said supports by means separate from and in addition to said rib holders, said rib elements thus located providing positioning means with intervening spaces for the accommodation of definite groups of the other rib elements of the grate assembly and each of the respective unitary sections of the detachable rib holder being correlated to a single group of the rib elements.

CHARLES R. CARR.